United States Patent
Tangella et al.

(10) Patent No.: US 12,417,054 B2
(45) Date of Patent: Sep. 16, 2025

(54) METHOD AND A MEMORY CONTROLLER FOR MANAGING MEMORY OPERATIONS IN A STORAGE DEVICE

(71) Applicant: SAMSUNG ELECTRONICS CO., LTD., Suwon-si (KR)

(72) Inventors: Manoj Kumar Tangella, Bengaluru (IN); Rakesh Balakrishnan, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 18/622,307

(22) Filed: Mar. 29, 2024

(65) Prior Publication Data

US 2024/0329884 A1 Oct. 3, 2024

(30) Foreign Application Priority Data

Mar. 30, 2023 (IN) .............................. 202341024043
Mar. 28, 2024 (IN) .............................. 202341024043

(51) Int. Cl.
G06F 3/06 (2006.01)

(52) U.S. Cl.
CPC .......... *G06F 3/0659* (2013.01); *G06F 3/0604* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| 9,459,687 B2 | 10/2016 | Park et al. | |
| 9,870,320 B2 | 1/2018 | Lin et al. | |
| 2010/0001812 A1* | 1/2010 | Kausch | H03H 7/30 333/172 |
| 2021/0373971 A1* | 12/2021 | Lu | G06F 9/5088 |
| 2022/0391090 A1* | 12/2022 | Muthiah | G06N 5/022 |

OTHER PUBLICATIONS

Park et al., "A Reconfigurable FTL (Flash Translation Layer) Architecture for NAND Flash-Based Applications," ACM Transactions on Embedded Computing Systems, vol. 7, No. 4, Article 38, Jul. 2008, Total 23 pages, https://people.eecs.berkeley.edu/~kubitron/cs262/handouts/papers/a38-park.pdf.

Wu et al., "Rethink the Design of Flash Translation Layers in a Component-Based View," Digital Object Identifier 10.1109/ACCESS.2017.2718559, vol. 5, 2017, Total 18 pages, https://ieeexplore.ieee.org/stamp/stamp.jsp?arnumber=7954938.

* cited by examiner

*Primary Examiner* — Hiep T Nguyen
(74) *Attorney, Agent, or Firm* — Sughrue Mion, PLLC

(57) ABSTRACT

There is provided a method and memory controller for managing memory operations in storage device. The memory controller receives plurality of requests from a user. The memory controller switches operating mode of storage device dynamically based on time interval between each of the plurality of requests and predefined threshold. The switching comprises notifying first cores to switch second cores from active state to power down state while switching to scaled down mode and restarting second cores while switching to striping FTL mode. Thereby, managing memory operations of storage device. Thus, the present disclosure manages the memory operations and optimises power consumption of the storage device.

20 Claims, 7 Drawing Sheets

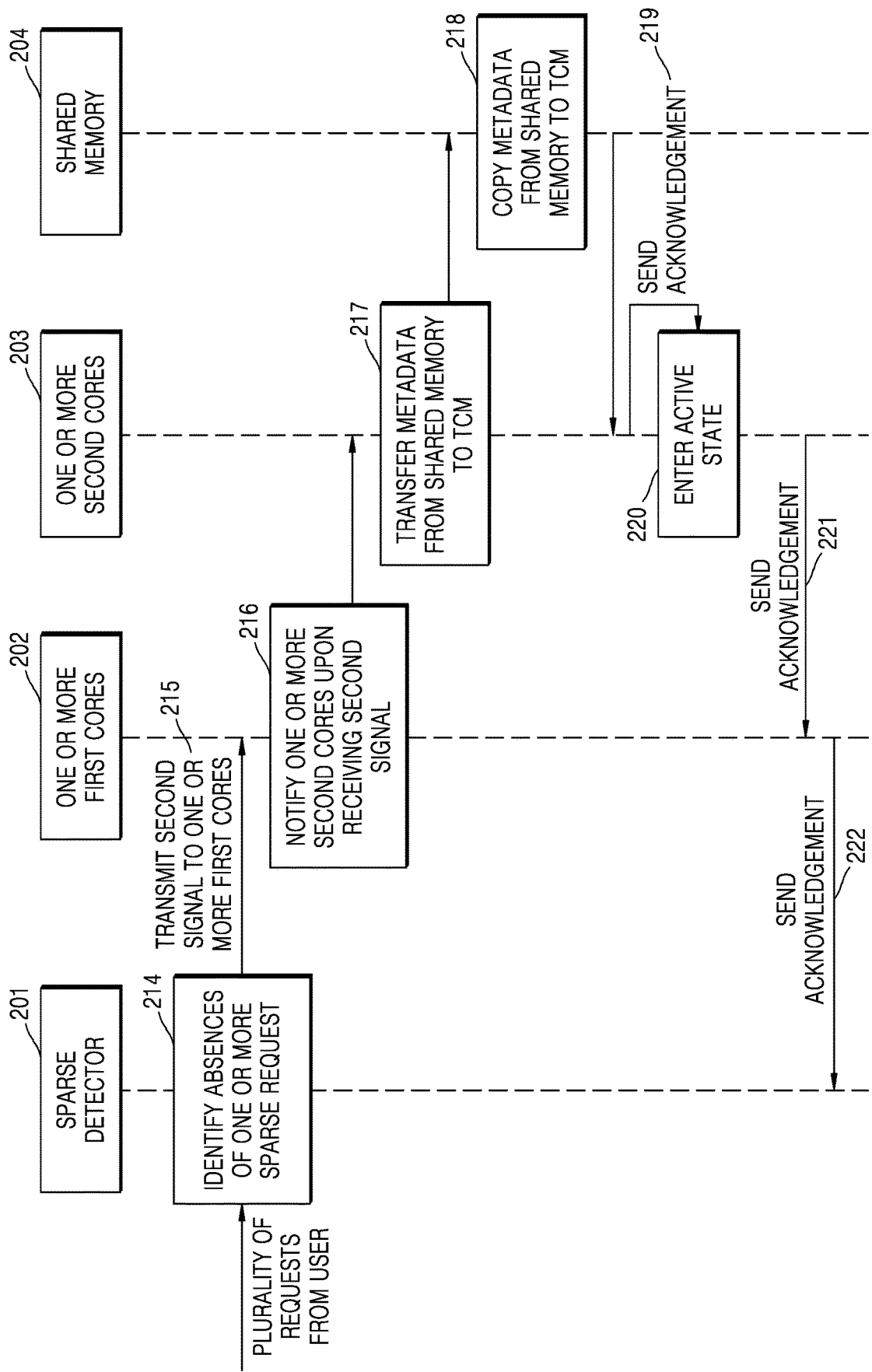

METHOD AND A MEMORY CONTROLLER FOR MANAGING MEMORY OPERATIONS IN A STORAGE DEVICE

CROSS-REFERENCE TO RELATED APPLICATION(S)

This application is based on and claims priority to Indian Provisional Application No. 202341024043 filed on Mar. 30, 2023, and Indian Non-Provisional patent application Ser. No. 202341024043 filed on Mar. 28, 2024, in the Indian Patent Office, the disclosure of which is incorporated by reference herein in its entirety.

BACKGROUND

1. Field

The disclosure relates to memory management in a storage device, and in particular, to a method and a memory controller for managing memory operations in a storage device.

2. Description of Related Art

Generally, electronic devices, such as, computers, mobile phones, tablets, etc., include a storage device that stores data and/or programs. The storage device may be a hardware device, such as a memory device, which is used to store data. The memory device may include, but is not limited to, Magnetic Memory Devices (MMD) such as floppy disks, hard drives, zip disks, magnetic strips and the like, Optical Memory Devices (OMD) such as Compact Disk (CD), blue ray disk, Digital Versatile Disk (DVD) and the like, Flash Memory Devices (FMD) such as Universal Serial Bus (USB) drives, memory cards, memory sticks, and Secure Digital (SD) cards and the like. Recently, the flash memory devices are increasingly being adopted in different environments and use cases. The flash memory device is an electronic non-volatile computer memory storage medium that can be electrically erased and reprogrammed. The two main types of flash memory devices are NOR flash memory devices and NAND flash memory devices. The flash memory devices may be implemented in various environments and may consume a lot of power. For example, the flash memory devices may be included in electronic devices, such as mobile phones, personal computers (PC), watches, notebook, tablets, and the like. Thus, due to high power consumption, there is high heat dissipation which results in degradation in the operation of the electronic devices.

Host devices, such as smart phones, may provide sparse input/output (I/O) commands. The sparse I/O are commands that are separated by a small interval of time, which is not enough time for the host device to enter into low power mode, or sleep mode. This makes it challenging for the flash device to optimize power consumption. In related art systems, power saving schemes rely on idle time interval between commands and may switch off components that are not being used by the host device in order to save power. However, in case of sparse I/O commands, the components cannot be switched off to save the power as the time interval between the sparse I/O commands is very small and the components are needed to service the commands. Also, the time interval between commands is not enough to enter deep sleep mode and wake up from sleep. Further, majority of the flash memory devices use striping Flash Translation layer (FTL) architecture, in which the commands are distributed to available flash cores in the host devices, and the flash cores within the flash memory devices consume major chunk of power. This makes it impossible to turn/switch off flash cores that are not utilized because the host command can be directed to any flash cores due to the striping mechanism.

The description in the related art section is provided only for enhancement of understanding of the general background of the invention and should not be taken as an acknowledgement or any form of suggestion that this information forms the prior art already known to a person skilled in the art.

SUMMARY

According to an aspect of the disclosure, there is provided a method of managing memory operations in a storage device, the method including: receiving, by a memory controller, a plurality of requests related to memory operations in the storage device; and dynamically switching, by the memory controller, an operating mode of the storage device between a striping Flash Translation Layer (FTL) mode and a scaled down mode based on a comparison between a time interval between each of the plurality of requests and a reference value, wherein the switching includes: notifying one or more first cores from among a plurality of cores associated with the storage device to switch one or more second cores from among the plurality of cores from an active state to a power down state while switching to the scaled down mode, and notifying the one or more first cores to restart the one or more second cores while switching to the striping FTL mode.

According to an aspect of the disclosure, there is provided a memory controller including: a memory storing one or more instructions; and a processor configured to execute the one or more instructions to: receive a plurality of requests related to memory operations in a storage device; and dynamically switch an operating mode of the storage device between a striping flash translation layer (FTL) mode and a scaled down mode based on a comparison between a time interval between each of the plurality of requests and a reference value, wherein the switching the operating mode of the storage device between the striping flash translation layer (FTL) mode and the scaled down mode includes: notifying one or more first cores from a plurality of cores associated with the storage device to switch one or more second cores from among the plurality of cores from an active state to a power down state while switching to the scaled down mode, and notifying the one or more first cores to restart the one or more second cores while switching to the striping FTL mode.

According to an aspect of the disclosure, there is provided a memory controller including: a memory storing one or more instructions; and a processor configured to execute the one or more instructions to: receive a plurality of first requests related to first memory operations in a storage device; compare a first time interval between the plurality of first requests with a reference value; based on a determination that the first time interval is less than the reference value, switch from a striping flash translation layer (FTL) mode to a scaled down mode by notifying one or more first cores from among a plurality of cores associated with the storage device to switch one or more second cores from among the plurality of cores from an active state to a power down state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In The same numbers are used throughout the figures to reference like features and components. Some example embodiments of device or system and/or methods in accordance with embodiments of the present subject matter are now described, by way of example only, and with reference to the accompanying figures, in which:

FIG. 2B illustrates a sequence diagram for managing memory operations in the storage device by switching from a scaled down mode to a striping FTL mode, in accordance with some example embodiments the disclosure;

Figure 1:
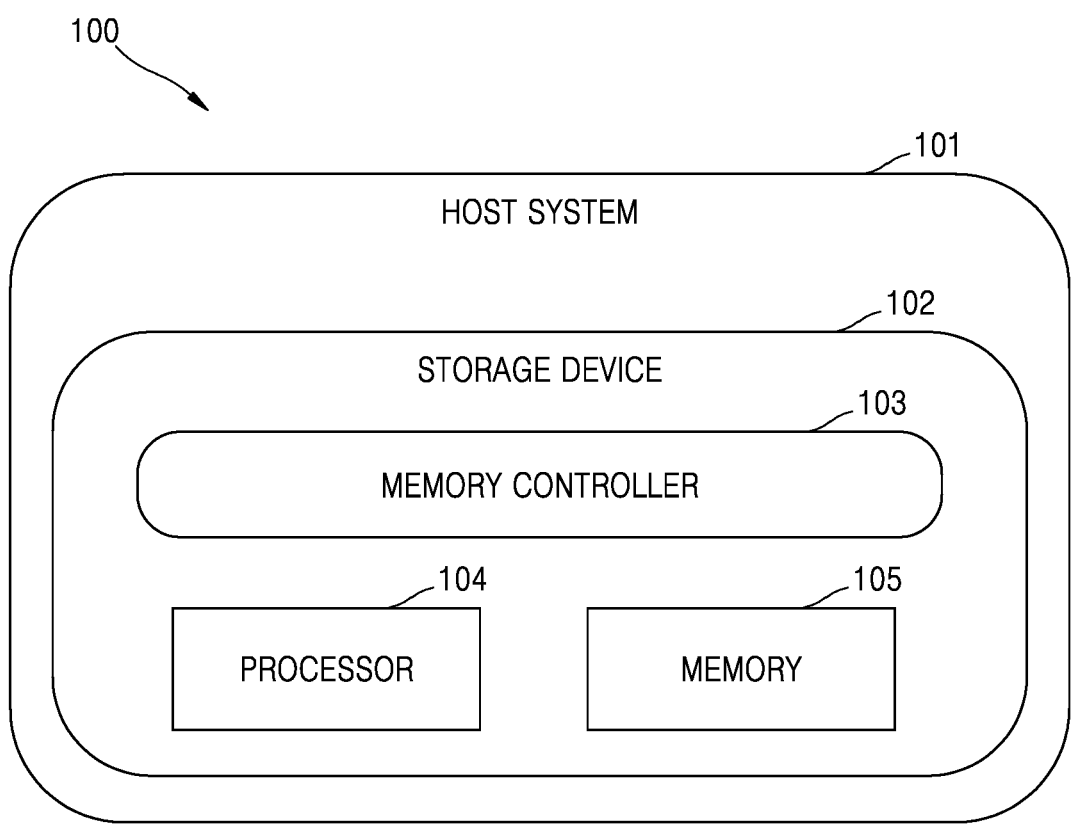
FIG. 1 shows an exemplary environment for managing memory operations of a storage device, in accordance with some example embodiments of the disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the disclosure, the word "exemplary" is used herein to mean "serving as an example, instance, or illustration." Any embodiment or implementation of the subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components, elements, operations or steps does not include only those components, elements, operations or steps but may include other components, elements, operations or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components, elements, operations or steps does not include only those components, elements, operations or steps but may include other components, elements, operations or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

The disclosure relates to a memory controller and a method for managing memory operations in a storage device. Generally, in a case in which sparse requests (e.g., sparse input/output (I/O) requests) are obtained from a user, it is challenging for the storage device such as, a flash memory device to optimize power consumption. That is, in a case in which sparse I/O requests are obtained, a host device such as a mobile phone may not be able to enter sleep mode as the time interval between the sparse requests are very small. Further, in related art systems, in a case in which sparse requests are obtained, components of the storage device cannot be turned off as they are needed to service the sparse requests. Moreover, as the time interval between the sparse requests is not enough for the components to enter deep sleep and wake up from sleep mode, the components cannot be turned off. Thus, resulting in excess power consumption by the flash memory devices and degradation of the host device. To overcome the above problem, according to one or more aspects of the disclosure, there is provided a method for managing the memory operations in the storage device by switching between one operating mode of the storage device to another operating mode of the storage device. The method includes, on detecting sparse requests obtained from the user, dynamically switching the operating mode of the storage device from a striping FTL mode to a scaled down mode. The method may further include, while switching the operating mode, converting/switching one or more cores of the storage device from an active mode to a power down mode or from the power down mode to the active mode for managing the memory operations in the storage device. Thus, according to one or more aspects of the disclosure, there is provided a method for optimizing power consumption by switching the operating modes of the storage device based on identifying sparse requests.

FIG. 1 shows an exemplary environment 100 for managing memory operations in a storage device. The environment 100 includes a host system 101 and a storage device 102. According to an example embodiment, the storage device 102 may be implemented within the host system 101. In an example embodiment, the storage device 102 may be connected to the host system 101. According to some example embodiments, the host system 101 may be a smartphone, a smartwatch, a mobile phone, and the like. However, the disclosure is not limited thereto, and as such, according other example embodiment, the host system 100 may be implemented by other types of electronic device. In an example embodiment, the storage device 102 may be implemented within the host system 101. The storage device 102 may be any type of computing hardware that is used for storing, porting, or extracting data files and objects. The storage device 102 may include, but is not limited to, a flash memory device. The flash memory device is an electronic non-volatile computer memory storage medium that may be electrically erased and reprogrammed. The two main types of flash memory devices may include NOR flash memory devices and NAND flash memory devices. The storage device 102, such as the flash memory device, may include a plurality of cores for performing memory operations in the storage device 102. In an example embodiment, the plurality of cores of the storage device 102 may be associated with respective tightly coupled memories (TCMs) of the storage device 102. In an example embodiment, the storage device 102 may include a shared memory. The TCMs may provide low-latency memory access without an unpredictable access time that can be used by the plurality of cores. The shared memory is a memory that may be simultaneously accessed by the plurality of cores to provide communication between the cores. Further, the storage device 102 includes a memory controller 103 for managing memory operations associated with the storage device 102. The storage device 102 may include a processor 104, and a memory 105. In some example embodiments, the memory 105 may be communicatively coupled to the processor 104. The memory 105 stores instructions, executable by the processor 104, which, on execution, may cause the memory controller 103 of the storage device 102 to manage memory operations in the storage device 102, according to one or more example embodiments of the disclosure.

According to an example embodiment, the host system 101 may receive a plurality of requests for performing memory operations. For example, a user may request to perform memory operations by transmitting a plurality of requests to the host system 101. The plurality of requests transmitted by the user may be one or more sparse requests or one or more normal requests. The one or more normal requests are input/output commands where time interval between the input/output commands is equal to or more than a threshold. According to an example embodiment, the threshold may be a predetermined or a predefined amount of time. Thus, allowing the host system 101 to enter into a sleep mode and wake from the sleep mode within the predefined threshold. For example, consider a scenario, in which, a first request c1, a second request c2 and a third request c3 are received by the host system, where the time interval between requests c1 and c2 and requests c2 and c3 may be 100 milliseconds, which may be equal to the predefined threshold. In such case, the host system 101 may enter from an active mode to the sleep mode and wake from the sleep mode to enter the active mode. While the one or more sparse requests are input/output commands where time interval between the input/output commands is less than the predefined threshold. For example, consider a scenario, in which, a fourth request c4, a fifth request c5 and a sixth request c6 are received by the host system, where the time interval between requests c4 and c5 and requests c5 and c6 may be 10 milliseconds, which may be less than the predefined time interval. In such cases, the host system 101 may not be able to enter the sleep mode and wake from the sleep mode. In an example embodiment, the predefined threshold may be set by the user of the host system 101. In an example embodiment, the predefined threshold may be set based on one or more factors. The one or more factors may include, but is not limited to, time interval between two requests, current incoming I/O performance, time gap or time interval between successive I/O commands and the like. In an example embodiment, the time gap or the time interval is inversely proportional to host performance. In a case in which the user transmits the plurality of requests, the memory controller 103 associated with the storage device 102 may check the time interval between each of the plurality of requests. The plurality of requests may be related to memory operations. The memory operations include a read request and a write request. The memory controller 103 may detect presence of one or more sparse requests from the plurality of requests by comparing the time interval between each of the plurality of requests with the predefined threshold. Upon comparing the time interval between each of the plurality of requests with the predefined threshold, the memory controller 103 may identify that the time interval between each of the plurality of requests is less than the predefined threshold, thus detecting the one or more sparse requests. In an example embodiment, the detection of the one or more sparse requests may be performed using existing known related art techniques. In an example embodiment, the storage device 102 operates in striping flash translation layer (FTL) mode during reception of the plurality of requests. According to an example embodiment, the FTL techniques may be defined as software or an algorithm that allows an operating system to read and write flash-based memory operations in the storage device 102.

Upon detecting the one or more sparse requests, the memory controller 103 may dynamically switch an operating mode of the storage device 102 between the striping Flash Translation Layer (FTL) mode and a scaled down mode. In the striping FTL mode, the plurality of cores of the storage device 102 may be active. In the scaled down mode, one or more core of the plurality of cores of the storage device 102 may be active and rest of the other cores may be in sleep mode. Further, in a case in which the memory controller 103 detects the one or more sparse requests, the memory controller 103 may switch from the striping FTL mode to the scaled down mode. In an example embodiment, while switching from the striping FTL mode to the scaled down mode, the memory controller 103 may transmit a first signal to one or more first cores from among the plurality of cores associated with the storage device 102. Upon receiving the first signal, the one or more first cores may notify one or more second cores from among the plurality of cores to transfer respective metadata information from respective tightly coupled memories (TCMs) to a shared memory and also to switch from an active state to a power down state. According to an example embodiment, the one or more first cores may be one or more primary (or main) cores, and the one or more second cores may be one or more slave (or sub) cores. In an example embodiment, the shared memory may be accessible by the plurality of cores of the storage device 102. Further, the metadata information may include, but is not limited to, a mapping table associated with the plurality of cores, location information about the mapping table, logical page number (LPN), and the like. Upon transmission of the metadata information, the operating mode of the storage device 102 is switched from the striping FTL mode to the scaled down mode. Further, in a case in which the storage device 102 is in the scaled down mode, the memory controller 103 may determine an identification number of a core associated with each of the one or more sparse requests based on a function of LPN corresponding to the one or more sparse requests and a number of the plurality of cores. The memory controller 103 fetches the metadata information from the shared memory based on the identification number of the core for each of the one or more sparse requests. Further, the memory controller 103 may allocate each of the one or more sparse requests to a storage memory associated with a respective core of the plurality of cores, for performing the memory operations. The storage memory may include, but is not limited to, NAND gates, NOR gates, and the like.

In an example embodiment, in a case in which a memory operation is a read request, the memory controller 103 upon fetching the metadata information may identify presence of a mapping table in the shared memory for the core associated with the read request based on the identification number. For example, in a case in which a memory operation, among the memory operations, is a read request, the memory controller 103 may identify presence of a mapping table in the shared memory for the core associated with the read request based on the identification number. Upon identifying the presence of the mapping table, the memory controller 103 may allocate the read request to the storage memory associated with the respective core for performing the read request. However, upon identifying absence of the mapping table, the memory controller 103 may retrieve the mapping table for the core based on location information about the mapping table stored in the shared memory. Upon retrieving the mapping table, the memory controller 103 may store the retrieved mapping table for the core associated with the read request to the shared memory.

In an example embodiment, in a case in which a memory operation, among the memory operations, is a write request, the memory controller 103 may update the metadata information to the shared memory for the core associated with each of the one or more sparse requests, upon allocating each of the one or more sparse requests to the storage memory. The metadata information may be updated based on the identification number corresponding to the respective core based on the write request being completed. Further, the memory controller 103 may store the mapping table to the storage memory for the core associated with each of the one or more sparse requests based on the identification number corresponding to the respective core and one or more criteria. The one or more criteria may be one or more predefined criteria, which includes a predefined time and memory usage of the storage device. For example, in a case in which the user sets the predefined time as every one hour, the memory controller 103 may store the mapping table to the storage memory after every one hour. In another example, if the memory usage of the storage device 102 is beyond a predefined value, the memory controller 103 may store the mapping table to the storage memory. However, the predefined criteria are not limited to time and memory usage, and as such, according to various other example embodiments, the predetermined criteria may include other criteria.

Further, in a case in which the memory controller 103 detects absence of one or more sparse requests from the plurality of requests, the memory controller 103 may switch the scaled down mode to the striping FTL mode. In an example embodiment, while switching from the scaled down mode to the striping FTL mode, the memory controller 103 may transmit a second signal to the one or more first cores. The one or more first cores upon receiving the second signal notifies the one or more second cores to transfer respective metadata information from the shared memory to respective TCMs and restart the one or more second cores by switching from the power down state to the active state. Further, the memory controller 103 may switch the operating mode of the storage device 102 from the scaled down mode to the striping FTL mode upon transmission of the metadata information.

Figure 2A:
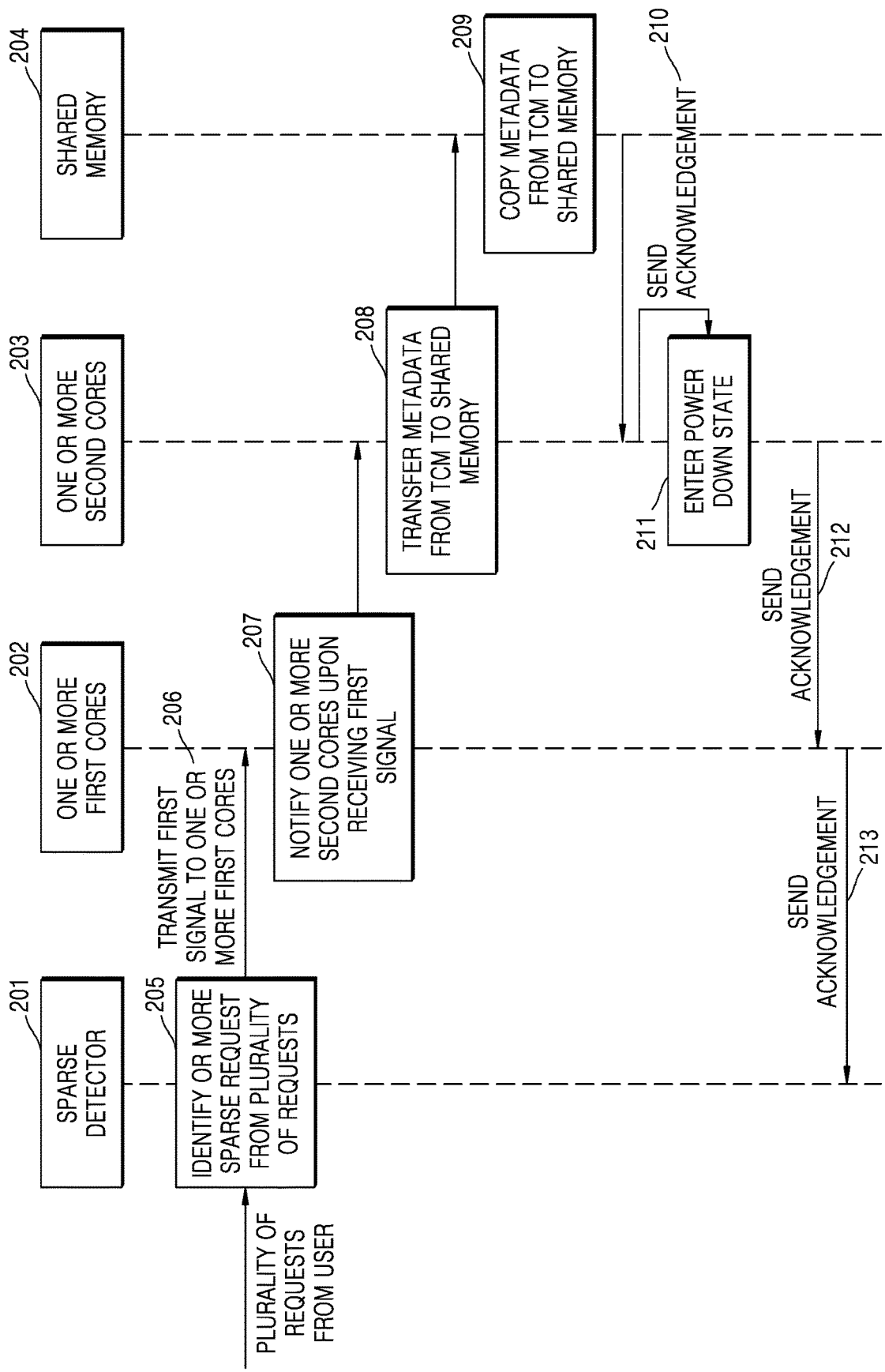
FIG. 2A illustrates a sequence diagram for managing memory operations in the storage device by switching from a striping FTL mode to a scaled down mode, in accordance with some example embodiments of the disclosure.

FIG. 2A illustrates a sequence diagram for managing memory operations in the storage device by switching from a striping FTL mode to a scaled down mode, in accordance with some example embodiments of the disclosure.

Initially, in a case in which a plurality of requests (also referred as I/O commands) are received from a user, a sparse detector 201 may be configured to identify one or more sparse requests from the plurality of requests. According to an example embodiment, the sparse detector 201 may be implemented in the storage device 102. In an example embodiment, the sparse detector 201 may function similar to existing sparse request detectors in related art memory devices. According to an example embodiment, the sparse detector may be implemented by hardware, software or a combination of hardware and software. The one or more sparse requests may also be referred as one or more sparse I/O commands. For example, the one or more sparse requests are commands/requests that are separated by a small interval of time. That is, the one or more sparse requests may be commands/requests that are separated by an interval of time less than a threshold amount of time. Due to the small interval of time, the host system 101 is prevented from entering into a low power state/power down state. In a case in which the sparse detector 201 identifies presence of the one or more sparse requests as shown in operation 205 of FIG. 2A, the sparse detector 201 may transmit the identified one or more sparse requests to the memory controller 103. The memory controller 103, upon receiving the identified one or more sparse requests, may transmit a first signal to the one or more first cores 202 as shown in operation 206. In an example embodiment, if there are N number of cores associated with the storage device 102, M cores may be referred as first cores and cores other than M cores (e.g., N-M cores) may be referred as second cores. Here, N and M are integers. In an example embodiment, the one or more first cores 202 may be selected from among the plurality of cores in a round-robin process. Further, in a case in which the one or more first cores 202 receive the first signal, the one or more first cores 202 notify the one or more second cores 203 as shown in operation 207, to transfer the metadata information from their respective TCMs to the shared memory 204 as shown in operation 208. According to an example embodiment, the respective TCMs are present in the storage device 102. Thus, the one or more second cores 203 may copy their respective metadata information from their respective TCMs to the shared memory 204, as shown in operation 209. Further, upon copying the metadata information, an acknowledgement message may be transmitted to the one or more second cores 203 as shown in operation 210. Upon receiving the acknowledgement message, the one or more second cores 203 enter a power down state as shown in operation 211. The one or more second cores 203 sends the acknowledgment message to the one or more first cores 202 as shown in operation 212, which in turn is transmitted to the sparse detector 201 as shown in operation 213. The acknowledgement message indicates that the one or more second cores 203 have switched from the active mode to the power down mode and the storage device 102 is operating in the scaled down mode.

Figure 3:
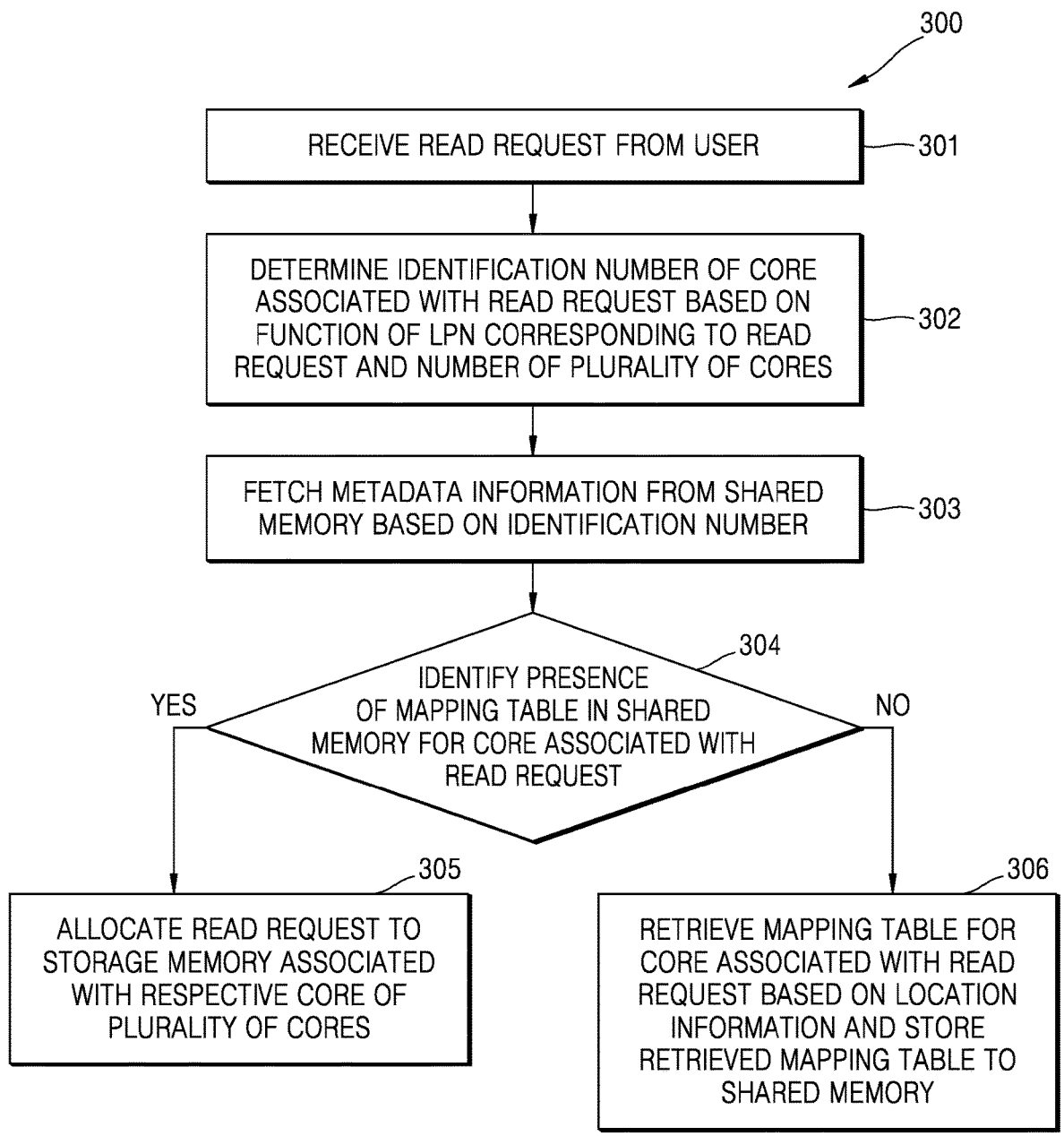
FIG. 3 illustrates a flowchart showing an example method for managing a read request in a scaled down mode of a storage device, in accordance with some example embodiments of the disclosure.

FIG. 3 illustrates a flowchart showing an example method for managing a read request in a scaled down mode of a storage device, in accordance with some example embodiments of the disclosure. In an example embodiment, in a case in which the storage device 102 is in the scaled down mode, and a memory operation to be performed is a read request, the one or more first cores 202 may receive the read request as shown in block 301 of FIG. 3. Further, upon receiving the read request, at block 302, the memory controller 103 may determine the identification number of a core associated with the read request based on the function of LPN corresponding to the read request and a number of the plurality of cores. According to an example embodiment, the identification number may be Fcore_ID. In an example embodiment, the identification number (Fcore_ID) may be determined by performing a modulus function with the LPN corresponding to the read request and the number of the plurality of cores. For example, if the LPN corresponding to the read request is two and the number of plurality of cores is 10, the identification number may be 2 i.e., the Fcore_ID is 2. Upon determining the identification number, at block 303, the memory controller 103 may fetch the metadata information from the shared memory 204 based on the identification number of the core for the read request. Further, at block 304, the memory controller 103 may identify presence of a mapping table in the shared memory 204 for the core. Here, the core may be associated with the read request based on the identification number (i.e., Fcore_ID 2 corresponding to the respective core). Upon identifying the presence of the mapping table, at block 305, the memory controller 103 may allocate the read request to the storage memory associated with the respective core of the plurality of cores, for performing the read request. For example, since the Fcore_ID is 2, the storage memory may be NAND_2 in the above scenario. Further, if the mapping table is not present in the shared memory 204, at block 306, the memory controller 103 may retrieve the mapping table for the core associated with the read request based on location information about the mapping table stored in the shared memory 204. Moreover, the memory controller 103 may store the retrieved mapping table for the core associated with the read request to the shared memory 204.

Figure 4:
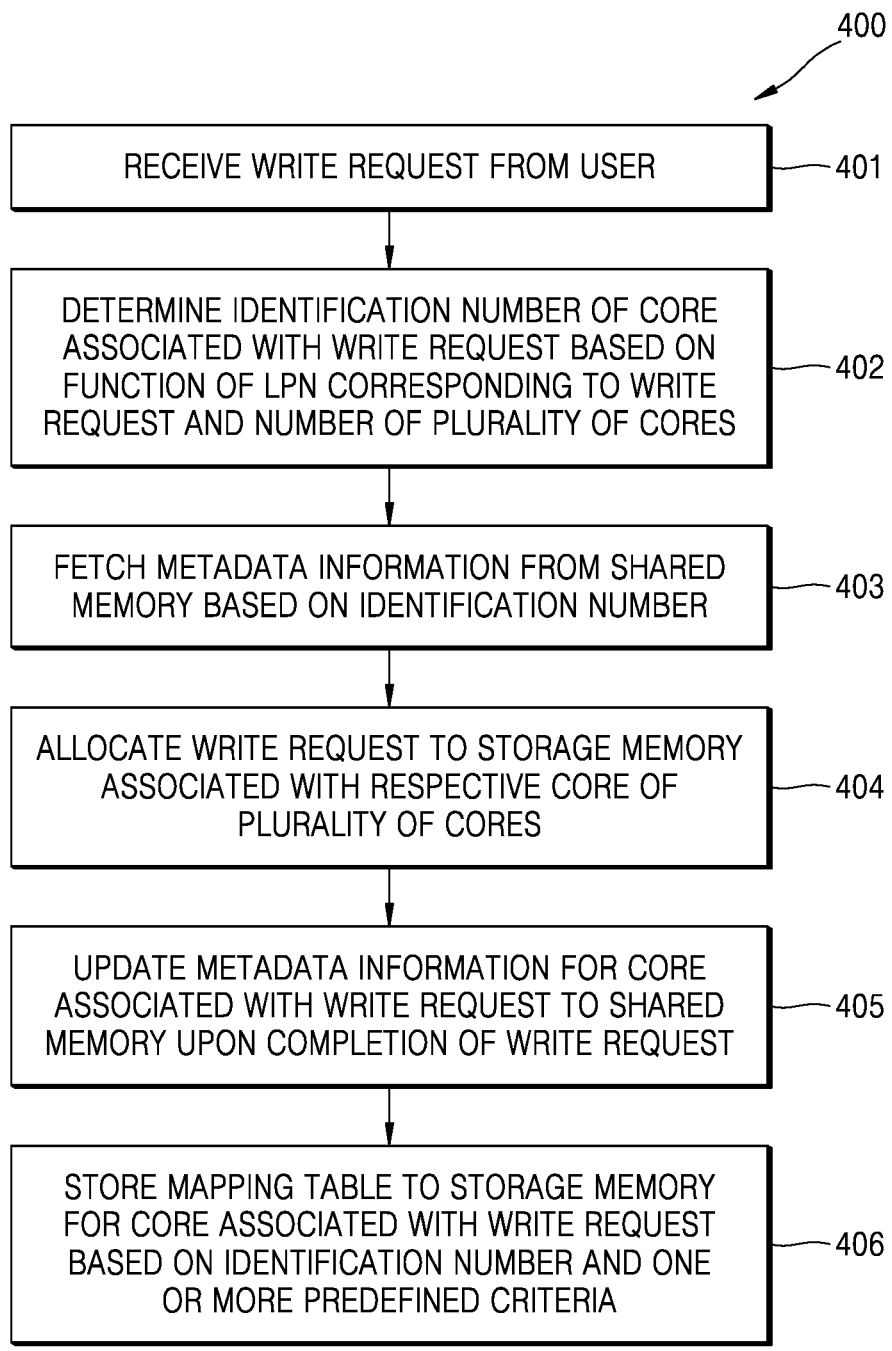
FIG. 4 illustrates a flowchart showing an example method for managing a write request in a scaled down mode, in accordance with some example embodiments of the disclosure.

FIG. 4 illustrates a flowchart showing an example method for managing write request in a scaled down mode, in accordance with some example embodiments of the disclosure. In an example embodiment, in a case in which the storage device 102 is in the scaled down mode, and a memory operation to be performed is a write request, the one or more first cores 202 may receive the write request as shown in block 401 of FIG. 4. Further, upon receiving, at block 402, the memory controller 103 may determine the identification number of a core associated with the write request based on the function of LPN corresponding to the write request and a number of the plurality of cores. In an example embodiment, the identification number (Fcore_ID) may be determined by performing a modulus function with the LPN corresponding to the write request and the number of the plurality of cores. For example, if the LPN corresponding to the write request is 3 and the number of plurality of cores is 10, the identification number may be 3 i.e., the Fcore_ID is 3. Upon determining the identification number, at block 403, the memory controller 103 may fetch the metadata information from the shared memory 204 based on the identification number of the core for the write request. At block 404, the memory controller 103 may allocate the write request to the storage memory associated with a respective core of the plurality of cores, for performing the write request. For example, since the Fcore_ID is 3, the storage memory may be NAND_3 in the above scenario. Upon completion of allocating the write request to the storage memory associated with a respective core of the plurality of cores, at block 405, the memory controller 103 may update the metadata information for the core associated with the write request based on the identification number corresponding to the respective core to the shared memory 204. Further, at block 406, the memory controller 103 may store the mapping table to the storage memory i.e., NAND_3 for the core associated with write request based on the identification number corresponding to the respective core and the one or more predefined criteria. The one or more predefined criteria includes the predefined time, and the memory usage of the storage device 102. According to another example embodiment, the memory controller 103 may update the metadata information for the core associated with the write request based on the identification number corresponding to the respective core to the shared memory 204 upon completion of writing in response to the write request.

FIG. 2B illustrates a sequence diagram for managing memory operations in the storage device by switching from scaled down mode to striping FTL mode, in accordance with some example embodiments of the disclosure.

In FIG. 2B, in a case in which the storage device 102 is in the scaled down mode, the plurality of requests may be received from the user. Upon receiving, the sparse detector 201 may be configured to identify one or more sparse requests from the plurality of requests. However, in a case in which the sparse detector 201 identifies absences of the one or more sparse requests, as shown in operation 214 of FIG. 2B, the sparse detector 201 may communicate the absence of the one or more sparse requests to the memory controller 103. In such case, the memory controller 103 may be configured to transmit a second signal to the one or more first cores 202 as shown in operation 215. Further, in a case in which the one or more first cores 202 receive the second signal, the one or more first cores 202 notify the one or more second cores 203 as shown in operation 216 to transfer the metadata information from the shared memory 204 to their respective TCMs as shown in the operation 217. The one or more second cores 203 copy their respective metadata information from the shared memory 204 to their respective TCMs as shown in operation 218. Further, an acknowledgement message may be sent to the one or more second cores 203 as shown in operation 219, upon copying the metadata information to the TCMs. Upon receiving the acknowledgement message, the one or more second cores 203 switch from the power down state to an active state as shown in operation 220. The one or more second cores 203 send the acknowledgment message to the one or more first cores 202 as shown in operation 221, which in turn is transmitted to the sparse detector 201 as shown in operation 222. The acknowledgement message indicates that the one or more second cores 203 have switched from the power down mode to the active mode and the storage device 102 is operating in the striping FTL mode.

Figure 5:
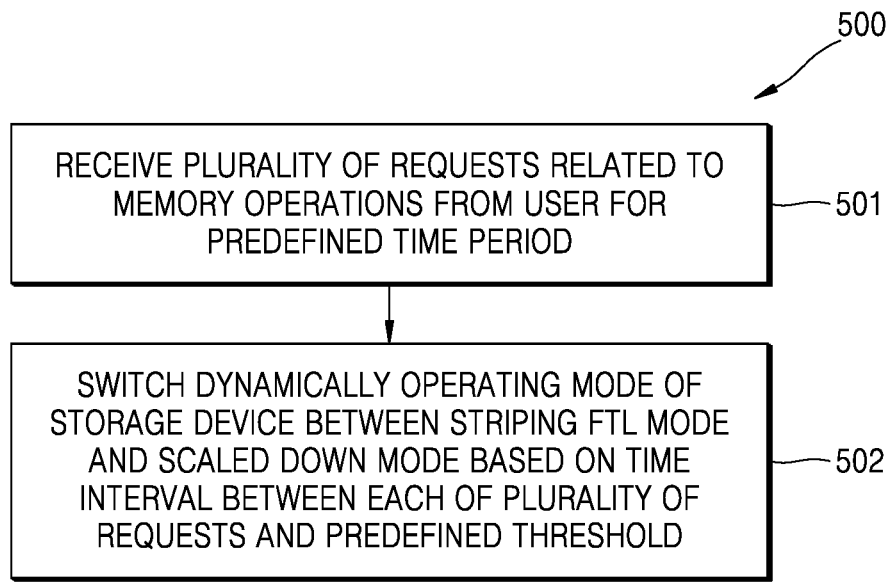
FIG. 5 illustrates a flowchart showing an example method for managing memory operations in the storage device, in accordance with some example embodiments of the disclosure.

FIG. 5 illustrates a flowchart showing an example method for managing memory operations in the storage device, in accordance with some example embodiments of the disclosure.

According to an example embodiment illustrated in FIG. 5, the method 500 may include one or more operations. The method 500 may be described in the general context of computer executable instructions. Generally, computer executable instructions can include routines, programs, objects, components, data structures, procedures, modules, and functions, which perform particular functions or implement particular abstract data types.

The order in which the method 500 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the memory controller 103 receives the plurality of requests related to memory operations from the user for the predefined time period.

At block 502, the memory controller 103 switches the operating mode of the storage device 102 between the striping FTL mode and the scaled down mode based on the time interval between each of the plurality of requests and the predefined threshold. The switching includes notifying the one or more first cores from among the plurality of cores associated with the storage device 102 to switch one or more second cores from among the plurality of cores from the active state to a power down state while switching to the scaled down mode and restart the one or more second cores while switching to the striping FTL mode. Thereby, managing the memory operations in the storage device 102.

Figure 6:
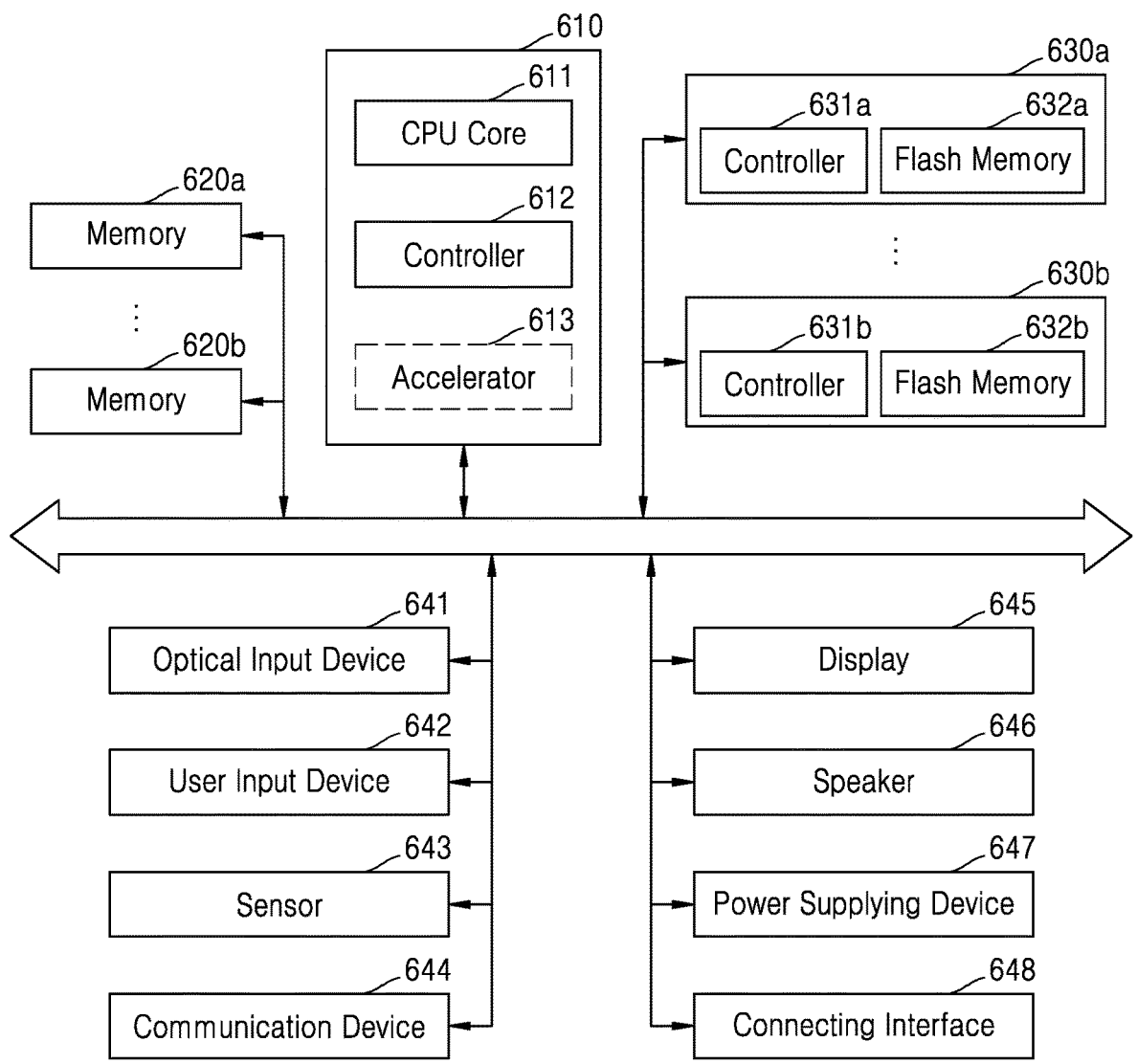
FIG. 6 illustrates a computing system architecture, in accordance with an example embodiment of the disclosure.

FIG. 6 is a diagram of a host system 600 to which the storage device 102 is applied, according to an example embodiment of the disclosure. The host system 600 of FIG. 6 may basically be a mobile system, such as a portable communication terminal (e.g., a mobile phone), a smartphone, a tablet personal computer (PC), a wearable device, a healthcare device, or an Internet of things (IOT) device, smart watches, and the like. However, the host system 600 of FIG. 6 is not necessarily limited to the mobile system and may be a PC, a laptop computer, a server, a media player, or an automotive device (e.g., a navigation device) or another type of electronic device according to another example embodiment.

Referring to FIG. 6, the host system 600 may include a main processor 610, and a plurality of memories. For example, the host system 600 may include memories 620*a* and 620*b*, and storage devices 630*a* and 630*b*. In addition, the host system 600 may include at least one of an optical input device 641, a user input device 642, a sensor 643, a communication device 644, a display 645, a speaker 646, a power supplying device 647, and a connecting interface 648.

The main processor 610 may control all operations of the host system 600, more specifically, operations of other components included in the host system 600. The main processor 610 may be implemented as a general-purpose processor, a dedicated processor, or an application processor.

The main processor 610 may include at least one CPU core 611 and further include a memory controller 612 configured to control the memories 620*a* to 620*b* and/or the storage devices 631*a* to 632*b* such as flash memory devices. In some example embodiments, the main processor 610 may further include an accelerator 653, which is a dedicated circuit for a high-speed data operation, such as an artificial intelligence (AI) data operation. The accelerator 653 may include a graphics processing unit (GPU), a neural processing unit (NPU) and/or a data processing unit (DPU) and be implemented as a chip that is physically separate from the other components of the main processor 610.

The memories 620*a* to 620*b* may be used as main memory devices of the host system 600. Although each of the memories 620*a* to 620*b* may include a volatile memory, such as static random access memory (SRAM) and/or dynamic RAM (DRAM), each of the memories 620*a* to 620*b* may include non-volatile memory, such as a flash memory, phase-change RAM (PRAM) and/or resistive RAM (RRAM). Memories 620*a* to 620*b* may be implemented in the same package as the main processor 610.

The storage devices 630*a* and 630*b* may serve as non-volatile storage devices configured to store data regardless of whether power is supplied thereto and have larger storage capacity than the memories 620*a* to 620*b*. The storage devices 630*a* and 630*b* may respectively include storage controllers (STRG CTRL) and NVM (Non-Volatile Memory) 632*a* and 632*b* configured to store data via the control of the storage controllers 631*a* and 631*b*. Although the NVMs 632*a* and 632*b* may include flash memories having a two-dimensional (2D) structure or a three-dimensional (3D) V-NAND structure, the NVMs may include other types of NVMs, such as PRAM and/or RRAM.

The storage devices 630*a* and 630*b* may be physically separated from the main processor 610 and included in the host system 600 or implemented in the same package as the main processor 610. In addition, the storage devices 630*a* and 630*b* may have types of solid-state devices (SSDs) or memory cards and be removably combined with other components of the host system 101 through an interface, such as the connecting interface 648 that will be described below. The storage devices 630*a* and 630*b* may be devices to which a standard protocol, such as a universal flash storage (UFS), an embedded multi-media card (eMMC), or a non-volatile memory express (NVMe), is applied, without being limited thereto.

The optical input device 641 may capture still images or moving images. The optical input device 641 may include a camera, a camcorder, and/or a webcam.

The user input device 642 may receive various types of data input by a user of the host system 600 and include a touch pad, a keypad, a keyboard, a mouse, and/or a microphone.

The sensor 643 may detect various types of physical quantities, which may be obtained from the outside of the host system 600 and convert the detected physical quantities into electric signals. The sensor 643 may include a temperature sensor, a pressure sensor, an illuminance sensor, a position sensor, an acceleration sensor, a biosensor, and/or a gyroscope sensor.

The communication device 644 may transmit and receive signals between other devices outside the host system 600 according to various communication protocols. The communication device 644 may include an antenna, a transceiver, and/or a modem.

The display 645 and the speaker 644 may serve as output devices configured to respectively output visual information and auditory information to the user of the host system 600.

The power supplying device 647 may appropriately convert power supplied from a battery embedded in the host system 600 and/or an external power source and supply the converted power to each of components of the host system 600.

The connecting interface 648 may provide connection between the host system 600 and an external device, which is connected to the host system 600 and capable of transmitting and receiving data to and from the host system 600. The connecting interface 648 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

An example embodiment of the present disclosure provisions a method for managing memory operations of the storage device by switching between striping FTL mode and the scaled down mode.

One or more aspects of the disclosure provides a method and a memory controller for reducing power consumption during presence of sparse I/O requests.

One or more aspects of the present disclosure provides a method and a memory controller for power optimization for the storage devices.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an example embodiment", "embodiment", "embodiments", "the embodiment", "the embodiments", "one or more embodiments", "some example embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an example embodiment with several components in communication with each other does not imply that all such components are required. On the contrary a variety of optional components are described to illustrate the wide variety of possible embodiments of the invention.

In a case in which a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 shows certain events occurring in a certain order. In alternative embodiments, certain operations may be performed in a different order, modified, or removed. Moreover, operations may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of managing memory operations in a storage device, the method comprising:
   receiving, by a memory controller, a plurality of requests related to memory operations in the storage device; and
   dynamically switching, by the memory controller, an operating mode of the storage device between a striping Flash Translation Layer (FTL) mode and a scaled down mode based on a comparison between a time interval between each of the plurality of requests and a reference value, wherein the switching comprises:
   notifying one or more first cores from among a plurality of cores associated with the storage device to switch one or more second cores from among the plurality of cores from an active state to a power down state while switching to the scaled down mode, and
   notifying the one or more first cores to restart the one or more second cores while switching to the striping FTL mode.

2. The method as claimed in claim 1, further comprising: identifying, by the memory controller, one or more sparse requests from the plurality of requests by comparing the time interval between each of the plurality of requests with the reference value.

3. The method as claimed in claim 1, wherein switching from the striping FTL mode to the scaled down mode comprises:
   transmitting, by the memory controller, a first signal to the one or more first cores, upon identification of one or more sparse requests among the plurality of requests,
   wherein the one or more first cores notifies the one or more second cores to transfer metadata information from one or more tightly coupled memories (TCMs) to a shared memory, based on the first signal.

4. The method as claimed in claim 1, wherein the memory operations comprise one of a read request and a write request.

5. The method as claimed in claim 3, wherein based on the storage device being in the scaled down mode, the method comprises:
   determining, by the memory controller, an identification number of a core associated with each of the one or more sparse requests based on a function of logical page number (LPN) corresponding to the one or more sparse requests and a number of the plurality of cores;
   fetching, by the memory controller, the metadata information from the shared memory based on the identification number of the core for each of the one or more sparse requests; and
   allocating, by the memory controller, each of the one or more sparse requests to a storage memory associated with a respective core of the plurality of cores, for performing the memory operations.

6. The method as claimed in claim 5, wherein based on a first memory operation among the memory operations being a read request, the method comprises:
   identifying, by the memory controller, presence of a mapping table in the shared memory for the core associated with each of the one or more sparse requests based on the identification number corresponding to the respective core; and
   performing, one of:
      allocating, by the memory controller, each of the one or more sparse requests to the storage memory associated with the respective core of the plurality of cores, for performing the read request, upon identifying presence of the mapping table; and
      retrieving, by the memory controller, the mapping table for the core associated with each of the one or more sparse requests based on location information about the mapping table stored in the shared memory and storing the retrieved mapping table for the core associated with each of the one or more sparse requests to the shared memory, upon identifying absence of the mapping table.

7. The method as claimed in claim 5, wherein based on a first memory operation among the memory operations being a write request, the method comprises:
   updating, by the memory controller, the metadata information for the core associated with each of the one or more sparse requests based on the identification number corresponding to the respective core to the shared memory, upon completion of allocating the write request to the storage memory; and
   storing, by the memory controller, a mapping table to the storage memory for the core associated with each of the one or more sparse requests based on the identification number corresponding to the respective core and one or more criteria.

8. The method as claimed in claim 7, wherein the one or more criteria comprise a predefined time and memory usage of the storage device.

9. The method as claimed in claim 1, wherein switching from the scaled down mode to the striping FTL mode comprises:
   detecting, by the memory controller, absence of one or more sparse requests from the plurality of requests; and
   transmitting, by the memory controller, a second signal to the one or more first cores,
   wherein the one or more first cores notifies the one or more second cores to transfer metadata information from a shared memory to tightly coupled memories (TCMs), based on the second signal.

10. A memory controller comprising:
   a memory storing one or more instructions; and
      a processor configured to execute the one or more instructions to: receive a plurality of requests related to memory operations in a storage device; and
      dynamically switch an operating mode of the storage device between a striping flash translation layer (FTL) mode and a scaled down mode based on a comparison between a time interval between each of the plurality of requests and a reference value,
      wherein the switching the operating mode of the storage device between the striping flash translation layer (FTL) mode and the scaled down mode comprises:
         notifying one or more first cores from a plurality of cores associated with the storage device to switch one or more second cores from among the plurality of cores from an active state to a power down state while switching to the scaled down mode, and
         notifying the one or more first cores to restart the one or more second cores while switching to the striping FTL mode.

11. The memory controller as claimed in claim 10, wherein the processor is further configured to identify one or more sparse requests from the plurality of requests by comparing the time interval between the plurality of requests with the reference value.

12. The memory controller as claimed in claim 10, wherein the processor is further configured to switch from the striping FTL mode to the scaled down mode by:
   transmitting a first signal to the one or more first cores, upon identification of one or more sparse requests among the plurality of requests, and
   wherein the one or more first cores notifies the one or more second cores to transfer metadata information from one or more tightly coupled memories (TCMs) to a shared memory, based on the first signal.

13. The memory controller as claimed in claim 10, wherein the memory operations comprise one of a read request and a write request.

14. The memory controller as claimed in claim 12, wherein based on the storage device being in the scaled down mode, the processor is further configured to:
determine an identification number of a core associated with each of the one or more sparse requests based on a function of logical page number (LPN) corresponding to the one or more sparse requests and a number of the plurality of cores;
fetch the metadata information from the shared memory based on the identification number of the core for each of the one or more sparse requests; and
allocate each of the one or more sparse requests to a storage memory associated with a respective core of the plurality of cores, for performing the memory operations.

15. The memory controller as claimed in claim 14, wherein based on a first memory operation among the memory operations being a read request, the processor is further configured to:
identify presence of a mapping table in the shared memory for the core associated with each of the one or more sparse requests based on the identification number corresponding to the respective core; and
performing, one of:
allocating each of the one or more sparse requests to the storage memory associated with the respective core of the plurality of cores, for performing the read request, upon identifying presence of the mapping table; and
retrieving the mapping table for the core associated with each of the one or more sparse requests based on location information about the mapping table stored in the shared memory, and storing the retrieved mapping table for the core associated with each of the one or more sparse requests to the shared memory, upon identifying absence of the mapping table.

16. The memory controller as claimed in claim 14, wherein based on a first memory operation among the memory operations being a write request, the processor is configured to:
update the metadata information for the core associated with each of the one or more sparse requests based on the identification number corresponding to the respective core to the shared memory, upon completion of allocating write request to the storage memory; and
store a mapping table to the storage memory for the core associated with each of the one or more sparse requests based on the identification number corresponding to the respective core and one or more criteria.

17. The memory controller as claimed in claim 16, wherein the one or more criteria comprises a predefined time, and memory usage of the storage device.

18. The memory controller as claimed in claim 10, wherein the processor is further configured to switch from the scaled down mode to the striping FTL mode by:
detecting absence of one or more sparse requests from the plurality of requests; and
transmitting a second signal to the one or more first cores, wherein the one or more first cores notifies the one or more second cores to transfer metadata information from a shared memory to tightly coupled memories (TCMs), based on the second signal.

19. A memory controller comprising:
a memory storing one or more instructions; and
a processor configured to execute the one or more instructions to:
receive a plurality of first requests related to first memory operations in a storage device;
compare a first time interval between the plurality of first requests with a reference value;
based on a determination that the first time interval is less than the reference value, switch from a striping flash translation layer (FTL) mode to a scaled down mode by notifying one or more first cores from among a plurality of cores associated with the storage device to switch one or more second cores from among the plurality of cores from an active state to a power down state.

20. The memory controller of claim 19, wherein, based on the memory controller operating in the scaled down mode, the processor is further configured to:
receive a plurality of second requests related to second memory operations in the storage device;
compare a second time interval between the plurality of second requests with the reference value;
based on a determination that the second time interval is equal to or greater than the reference value, dynamically switch from the scaled down mode to the striping FTL mode by notifying the one or more first cores to restart the one or more second cores.

* * * * *